US012391626B2

(12) United States Patent
Yendrek et al.

(10) Patent No.: US 12,391,626 B2
(45) Date of Patent: Aug. 19, 2025

(54) NUTRIENT SOURCES FOR PLANT GROWTH MEDIUMS

(71) Applicant: OMS INVESTMENTS, INC., Los Angeles, CA (US)

(72) Inventors: Craig Yendrek, Marysville, OH (US); Sara Eff, Hilliard, OH (US); Janis Steed, Radnor, OH (US); Andrew Pille, Columbus, OH (US); Jeff DeByl, Madison, WI (US); Tiffany Stegner, Marysville, OH (US); Samantha Burrell, Dublin, OH (US); Marcus Bertin, Plain City, OH (US); Steve Titko, Marysville, OH (US); Michael Anthony Ceddia, Dublin, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 16/555,938

(22) Filed: Aug. 29, 2019

(65) Prior Publication Data

US 2020/0071239 A1   Mar. 5, 2020

Related U.S. Application Data

(60) Provisional application No. 62/865,674, filed on Jun. 24, 2019, provisional application No. 62/725,208, filed on Aug. 30, 2018.

(51) Int. Cl.
| | |
|---|---|
| C05F 1/00 | (2006.01) |
| A01G 24/22 | (2018.01) |
| C05F 5/00 | (2006.01) |
| C05F 11/00 | (2006.01) |

(52) U.S. Cl.
CPC ............. *C05F 1/005* (2013.01); *A01G 24/22* (2018.02); *C05F 5/002* (2013.01); *C05F 11/00* (2013.01)

(58) Field of Classification Search
CPC ........ C05F 1/005; C05F 111/00; C05F 5/002; A01G 24/22
See application file for complete search history.

(56) References Cited

U.S. PATENT DOCUMENTS

| | | | | |
|---|---|---|---|---|
| 4,345,931 | A  * | 8/1982 | Meyer ..................... | C05B 7/00 71/30 |
| 8,623,110 | B2 * | 1/2014 | Bevans .................. | C05F 11/00 71/15 |
| 2005/0274164 | A1* | 12/2005 | Coates .................... | C05G 3/00 71/31 |
| 2014/0274694 | A1* | 9/2014 | Rodriguez-Kabana ..................... | C05F 11/00 504/101 |
| 2014/0323297 | A1* | 10/2014 | Harman ................. | C12P 21/06 435/256.7 |
| 2017/0036966 | A1* | 2/2017 | Evans .................... | C05F 11/00 |
| 2017/0297962 | A1* | 10/2017 | Evans .................... | C05C 11/00 |
| 2017/0297963 | A1* | 10/2017 | Evans .................... | C05F 5/002 |
| 2017/0327431 | A1* | 11/2017 | Evans .................... | C05B 17/00 |

(Continued)

*Primary Examiner* — Wayne A Langel

(57) ABSTRACT

Nutrient sources for a plant growth medium are disclosed. The nutrient sources include feather meal, soy meal, and optionally compost. Plant growth mediums including such nutrient sources exhibit desirable nutrient release profiles and advantageous plant growth. Methods of making and using the nutrient sources and plant growing mediums containing such nutrient sources are further disclosed.

19 Claims, 8 Drawing Sheets
(5 of 8 Drawing Sheet(s) Filed in Color)

(56) References Cited

U.S. PATENT DOCUMENTS

| | | | | |
|---|---|---|---|---|
| 2018/0057418 A1* | 3/2018 | Evans | ............... | C05G 5/12 |
| 2019/0062232 A1* | 2/2019 | Kalmbach | ............... | C05F 5/00 |
| 2019/0062233 A1* | 2/2019 | Kalmbach | ............... | C05F 9/04 |
| 2019/0345076 A1* | 11/2019 | Gaunt | ............... | C05F 17/80 |
| 2022/0267227 A1* | 8/2022 | Selkirk, Jr. | ............... | C05F 11/02 |

* cited by examiner

NUTRIENT SOURCES FOR PLANT GROWTH MEDIUMS

CROSS-REFERENCE TO RELATED APPLICATIONS

The present application claims the priority of U.S. Provisional Patent App. Ser. No. 62/725,208, entitled NUTRIENT SOURCES FOR PLANT GROWTH MEDIUMS, filed Aug. 30, 2018, and U.S. Provisional Patent App. Ser. No. 62/865,674, entitled NUTRIENT SOURCES FOR PLANT GROWTH MEDIUMS, filed Jun. 24, 2019, and hereby incorporates each application herein by reference in their respective entireties.

TECHNICAL FIELD

The present disclosure relates generally to nutrient sources for plant growth mediums. The nutrient sources exhibit desirable nutrient release profiles and facilitate desirable plant growth.

BACKGROUND

Plant growth mediums, such as garden soils and potting mixtures containing nutrient sources, facilitate the growth of plants by providing nutrient and irrigation benefits to plants rooted in the mediums. Plant growth mediums generally include nutrient sources, such as various fertilizers, to provide nutrients to plants. It would be desirable, however, to provide improved nutrient sources for plant growth mediums which exhibit improved plant safety, increased plant growth, and improved nutrient delivery compared to known nutrient sources.

SUMMARY

According to one embodiment, a nutrient source includes feather meal and soybean meal in a ratio of about 1:3 to a ratio of about 3:1 by weight of the nitrogen in the feather meal and soybean meal.

According to another embodiment, a nutrient source includes feather meal and soybean meal in a ratio of about 1:3 to a ratio of about 3:1 by weight of the nitrogen in the feather meal and soybean meal, and compost. The nutrient source releases about 40% or more of the total nitrogen available as a plant available nitrogen in a period of about 8 weeks or less.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
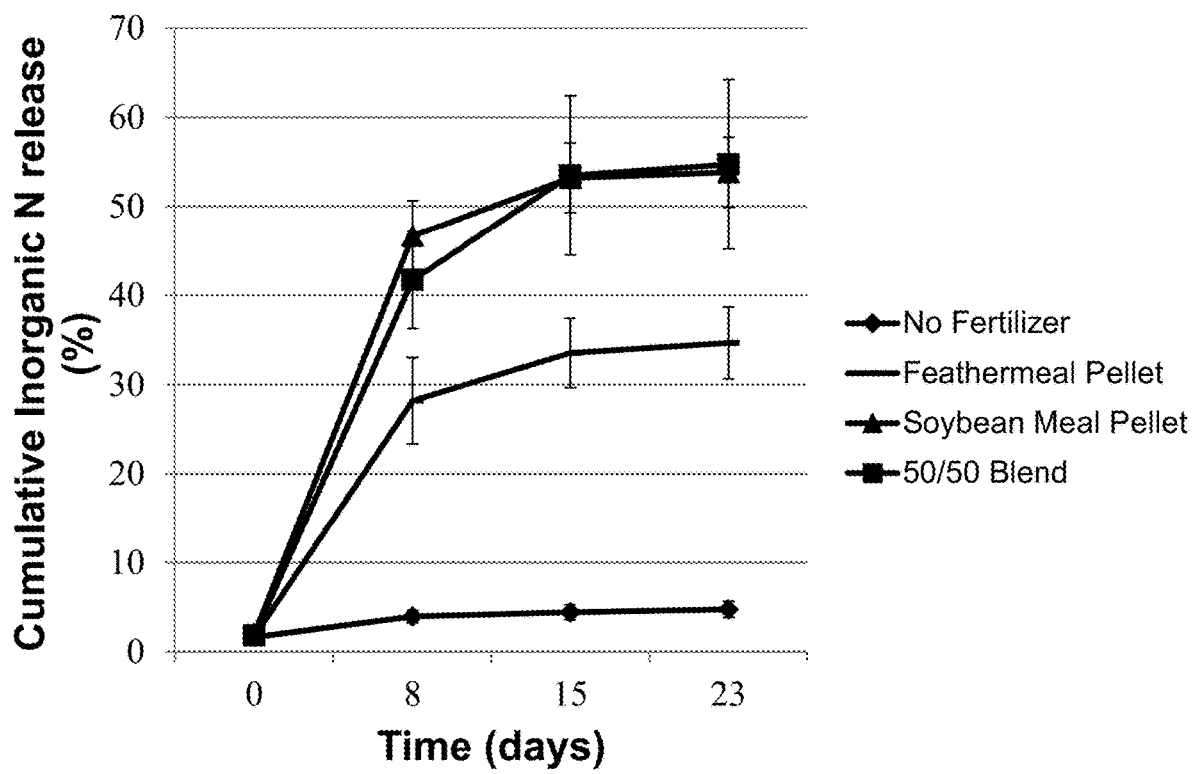
FIG. 1 depicts a graph illustrating the cumulative inorganic nitrogen release of various example nutrient sources in plant growth mediums.

Nutrient sources which can be combined with a base composition to form plant growth mediums exhibiting desirable nutrient release profiles and improved plant growth are described herein. The nutrient sources include feather meal, soybean meal or fish meal, and optionally compost. Nutrient sources including a combination of such components have been unexpectedly discovered to exhibit a synergistic release of nutrients and result in improved plant growth compared to use of either the constituent components alone or when compared to the nutrient sources of known organic plant growth mediums. In certain embodiments, the nutrient sources can be organic nutrient sources.

As can be appreciated, the individual components (e.g., feather meal, soybean meal or fish meal, and compost) of the nutrient sources described herein are generally known. However, the plant growth and nutrient benefits resulting from the described combinations of feather meal and soybean meal were surprising and unexpected. Without being bound by theory, it is believed that the combination of feather meal and soybean meal can provide the benefits observed herein through an unexpected combination of nutrient release synergy, pH buffering of the soil, and reduced ammonium toxicity. Microbes present in either the soil or compost, if included in the plant growth medium, may further assist in breaking down the nutrients in the feather meal and soybean meal and make such nutrients available to plants.

A wide variety of feather meal and soybean meal compounds can be suitable for the nutrient sources of the plant growth mediums described herein including feather meal and soybean meal derivatives. As can be appreciated, feather meal is a fertilizer generally produced by rendering poultry feathers under elevated heat and pressure and then grinding the feathers into particles. Soybean meal is formed from the remains of soybeans after soybean oil is removed. Typically, soybean meal is heat treated to denature any remaining organic compounds.

Both feather meal and soybean meal can be organic fertilizers if processed using only temperature or pressure. Organic feather meal and soybean meal nutrients can be desirable in certain embodiments because organic potting soil mixtures can be formed using such nutrients. In certain embodiments however, non-organic feather meal or soybean meal can alternatively be suitable. Examples of non-organic feather meals and soybean meals include feather meal and soybean meal processed using industrial chemicals or solvents such as feather meal and soybean meal hydrolysates. In certain embodiments, suitable feather meal and soybean meal compounds can further include any derivative compounds produced from feather meal and soybean meal or the precursor components of such meals. For example, suitable derivative feather meal and soybean meal compounds can include feather meal and soybean meal hydrolysates and other pre-processed meals derived from poultry feathers or soybeans.

In certain embodiments, suitable feather meal compositions for the nutrient sources of the plant growth mediums described herein can have a total nitrogen content of about 13% or greater and a moisture level of about 6% or less. In certain embodiments, feather meal can be granular (e.g., a pellet). For example, suitable feather meal granules in certain such embodiments can have a particle size distribution that allows 95% or more of the feather meal to pass through a 12 US mesh, about 70% or more of the feather meal to pass through a 18 US mesh but not be retained on a 70 US mesh, and less than 5% of the material to pass through a 70 US mesh.

As can be appreciated, feather meal is a slow-release nitrogen source which does not readily make nitrogen available to plants. It has been discovered that plant growth mediums including the nutrient sources described herein can desirably convert this slow release nitrogen into plant available nitrogen compounds (e.g., ammonium ($NH_4$) and nitrate ($NO_3$) compounds)), such that the nitrogen is more readily available to the plants. Unlike feather meal alone, the plant available nitrogen in the nutrient sources described herein can be released over a desirable period of time for maximum agronomic benefit.

In certain embodiments, suitable soybean meal compositions for the nutrient sources described herein can have a total nitrogen content of about 7% or greater, a total phosphorus source content of 1% or greater, and a total potassium source content of about 2% or greater. As can be appreciated, phosphorus and potassium can be found in any suitable form such as, for example, $P_2O_5$ and $K_2O$ respectively. Suitable moisture levels for the soybean meal compositions can be about 6% or less. In certain embodiments, the soybean meal can be granular and can have a particle size distribution that allows 95% or more of the soybean meal to pass through a 6 US mesh, about 35% or more of the soybean meal to pass through an 18 US mesh but not a 70 US mesh, and about 10% or more of the soybean meal to pass through a 70 US mesh.

As can be appreciated, soybean meal is a fast-release nitrogen source which rapidly makes nitrogen available to plants. However, the plant available nitrogen released by soybean meal alones fails to provide optimal agronomic benefits because the nitrogen is released too rapidly for plants to maximally benefit from the nitrogen. Additionally, the use of soybean meal as a nutrient source alone further exhibits other detriments such as undesirable pH changes. The nutrient sources described herein can provide a desirable agronomic release profile that is both slower than soybean meal alone and faster than feather meal alone.

Generally, feather meal and soybean meal can be blended together in various quantities to form the nutrient sources described herein. For example, in certain embodiments, the nutrient source of a plant growth medium can include about 25% to about 75% feather meal and about 25% to about 75% soybean meal. Expressed as a ratio, the plant growth mediums can include feather meal and soybean meal in a ratio of about 1:3 to a ratio of about 3:1 or any range having an integer value between a ratio of about 1:3 to about 3:1 including, for example, a ratio of about 1:1 to about 3:1 or a ratio of about 3:2. As used herein, all ratios express a comparison between the nitrogen weight of two or more components.

According to certain embodiments, plant growth mediums including the nutrient sources described herein can be organic plant growth mediums. As used herein, "organic" means that substantially all of the components of the plant growth medium are derived from one or more of animal matter, animal excreta, and vegetable matter. Organic plant growth mediums are substantially free of nutrients produced through chemical synthesis such as ammonia produced through the Haber process. As used herein, "substantially free of" means that the component is included at about 1% or less by weight or is included only as an unintentionally added byproduct of another component. As can be appreciated however, the plant growth mediums described herein can alternatively include organic nutrient sources while not being an organic plant growth medium.

In certain embodiments, the nutrient sources described herein can alternatively be formulated using non-organic components such as non-organic feather meal or non-organic soybean meal. Additionally, or alternatively, other components of the plant growth mediums can also be non-organic, such as non-organic wetting agents. As can be further appreciated, feather meal and soybean meal, organic or non-organic, can be used to enhance non-organic, or "conventional," plant growth mixtures formed with components such as ammonia or urea formaldehyde products produced through a chemical synthesis process.

As can be appreciated, plant growth mediums containing organic nutrient sources typically include relatively low concentrations of nitrogen because high loading levels of nitrogen can lead such organic plant growth mediums to exhibit ammonium toxicity. Use of the nutrient sources described herein, in contrast, can allow for the formation of plant growth mediums having high loading levels of nitrogen without suffering from ammonium toxicity due to favorable nutrient release profiles even when the nutrient source is organic. High loading levels of nitrogen can mean that nitrogen is included at relatively high concentrations or that large quantities of the nutrients can be applied. In certain embodiments, the plant growth mediums can be applied at a rate of about 1.5 pounds of nitrogen per cubic yard or less. For example, the plant growth mediums can be applied at a rate of 0.5 pounds nitrogen per cubic yard, about 0.75 pounds nitrogen per cubic yard, about 1 pound nitrogen per cubic yard, about 1.25 pounds nitrogen per cubic yard, or about 1.5 pounds nitrogen per cubic yard. In certain embodiments, the feather meal and soybean meal can provide substantially all of the nitrogen contained in a plaint growth medium.

It is believed that the plant growth mediums described herein can include high loading levels of nitrogen because the combination of feather meal and soybean meal as the nutrient source is believed to release plant available nitrogen (e.g., ammonium ($NH_4$) and nitrate ($NO_3$) compounds)) over desirable time periods without an increase in pH that is typically associated with the conversion of organic nitrogen to $NH_4$.

In certain embodiments, the combination of feather meal and soybean meal in the nutrient source of a plant growth medium can release plant available nitrogen over a period of about 60 days or greater, a period of about 90 days or greater, and/or a period of about 110 days or greater. In contrast, comparative plant growth mediums including only a single nitrogen source, such as chicken litter, cannot maintain the release of plant available nutrients at levels required to sustain an agronomic response at 90 days or greater. As used herein, an agronomic response means that sufficient nutrients are released to cause plant growth.

Additionally, plant growth mediums including the described nutrient sources can release greater quantities of plant available nitrogen than plant growth mediums including either feather meal or soybean meal individually. Those skilled in the art would not have anticipated or recognized this synergistic effect, but rather would have expected that the blending of feather meal and soybean meal would release an amount of plant available nitrogen essentially equivalent to the weighted average of the plant available nitrogen released by feather meal and soybean meal individually.

In certain embodiments, suitable nutrient sources for a plant growth medium can alternatively include a combination of fish meal and feather meal. The combination of fish meal and feather meal has been found to unexpectedly exhibit a desirable release of total plant available nitrogen. For example, in certain embodiments, a combination of 50% fish meal and 50% feather meal has been found to exhibit a plant available nitrogen release of about 54.9% nitrogen as a percentage of total added nitrogen. As can be appreciated, fish meal is generally formed by processing of fish and can be organic or non-organic depending upon the processing. Organic plant growth mediums can be formed when organic fish meal is selected. In certain embodiments, suitable nutrient sources can include a combination of fish meal, feather meal, and soybean meal.

In certain embodiments, the nutrient sources described herein can further include compost. In addition to the normal agronomic benefits associated with the inclusion of compost, such as increased soil organic matter, the combination of feather meal, soybean meal, and compost can further enhance the nutrient release dynamics, buffer the pH of the plant growth medium, and enhance plant growth.

For example, inclusion of compost in a nutrient source in combination with feather meal and soybean meal can increase the mineralization rate and more rapidly convert organic nitrogen to nitrate. In certain such embodiments, nutrient sources including 10% nitrogen, 2% phosphorous source content, and 2% potassium source content can convert nitrogen to nitrate over a period of about 2 weeks even when the nutrient source is organic. As can be appreciated, typical organic nutrient sources, such as feather meal alone, can require 3 to 4 weeks to convert organic nitrogen to nitrate. Additionally, the nutrient sources described herein can convert a greater quantity of nitrogen to nitrate than other known nutrient sources and can convert such nitrogen to nitrate over a greater duration of time (e.g., about 90 days or greater in certain embodiments). In certain embodiments, the inclusion of compost can also reduce ammonium toxicity.

In certain embodiments, nutrient sources containing a combination of feather meal, soybean meal, and compost can buffer the pH of a plant growth medium. As can be appreciated, plant growth mediums containing organic nutrient sources typically exhibit an increase in pH (e.g., an increase in alkalinity) about 7 days after application. The present nutrient sources can buffer such a pH change and can maintain a stable pH of about 6 to about 6.5 over a period of about 3 weeks or more. In certain embodiments, the plant nutrient sources described herein can allow a plant growth medium to maintain a stable pH of about 6.2 to about 6.4 over a period of 3 weeks or more. In certain embodiments, the nutrient sources described herein can minimize a pH spike to a spike of less than 10% pH. For example, the nutrient source can minimize a pH spike to a spike of 5% at 7 days and a spike of 2% at 14 days.

As can be appreciated, plant growth mediums containing the nutrient sources described herein can improve the growth of plants grown in such plant growth mediums.

Generally, a variety of composts which demonstrate sufficient maturity can be suitable for the nutrient sources described herein. As can be appreciated, the maturity of compost can be measured in several ways. For example, in certain embodiments, the maturity of compost can be evaluated through use of a performance and maturity bioassay. The bioassay includes a performance screen which grows a crop of tomatoes with half receiving the compost and half being "unfed." Compost is assigned a binary (+/−) rating with a positive indication being assigned if the dry weight of the tomatoes with compost is significantly higher than the unfed control. The bioassay also performs a germination test as a maturity screen. Compost samples are qualitatively assigned a positive score if germination rates are not significantly lower than the unfed control. Based on the performance screen and the maturity screen, the suitability of compost can be determined.

In certain embodiments, the suitability and maturity of compost can alternatively be determined through commercial testing. For example, Solvita® compost testing provides a Solvita Maturity index score. A Solvita Maturity score of 6 or greater is considered a mature compost herein.

In embodiments of a nutrient source including compost, the compost can be included at about 1% to about 800% by volume of the nutrient source or at any integer range between about 1% to about 80% by volume including, for example, at about 1% to about 70% by volume, at about 1% to about 50% by volume, at about 1% to about 30%, at about 1% to about 25% by volume, at about 1.5% to about 15% by volume, at about 2% to about 10% by volume, etc.

In certain embodiments including compost in the nutrient source, plant growth mediums including the nutrient source can include about 5% to about 15% nitrogen by weight, or any range having an integer value between about 5% to about 15% nitrogen by weight including, for example, 10% nitrogen by weight. In certain embodiments, the nutrient sources described herein can include about 7% to about 15% nitrogen, about 0.5% to about 4% of a phosphorous source, and about 0.5% to about 4%, or more, of a potassium source.

In certain embodiments, the benefits of compost, including improved nutrient release rates, reduced ammonium toxicity, and pH buffering, can be achieved through the alternative inclusion of microbes or other biostimulants.

In certain embodiments, the nutrient sources described herein can further include additional components. For example, in certain embodiments, nutrient sources can further include an organic nitrate such as sodium nitrate. In addition to sodium nitrate, additional examples of suitable organic nitrates can include potassium nitrate, worm castings, bat guano, bird guano, celery powder, poultry litter, fish meal/powder, fish liquid, and seaweed. In certain embodiments, the nutrient sources can additionally, or alternatively, include additional potassium.

Nutrient sources including an organic nitrate, such as sodium nitrate, can exhibit increased safety against ammonium toxicity. In certain embodiments, a suitable sodium nitrate is Chilean Nitrate ($NaNO_3$). Nutrient sources including an organic nitrate source can include the nitrate as a percentage of the overall nitrogen level. For example, for plant growth mediums including a blend of feather meal and soybean meal (e.g., a 50:50 blend or the like) as a nitrogen source, about 5% to about 20% of the nitrogen can be from sodium nitrate including any integer quantities between about 5% to about 20%, such as about 15%.

It has also been discovered that the inclusion of potassium in a nutrient source described herein can increase the safety of a plant growth medium to resist ammonium toxicity. In particular, it has been found that increasing the level of potassium in a nutrient source can optimize the N-P-K ratio and can provide a buffer against ammonium toxicity. In certain embodiments, potassium can be included in a nutrient source at about 3%, or more, by weight, in certain embodiments, at about 4%, or more, by weight, in certain embodiments, at about 7%, or more, by weight, in certain embodiments, at about 10%, or more, by weight, and in certain embodiments, at about 12%, or more, by weight.

The nutrient sources described herein can be suitable for inclusion with a variety of different plant growth mediums. Specifically, the nutrient sources can be combined with suitable compositions to form garden and potting soils, soil amendments, seeding mulch, flower and vegetable furrow covering applications, and potting mixtures. As can be appreciated, such plant growth mediums can be formed by combining the nutrient source with the appropriate base composition (e.g., soil, seeding mulch, etc.). In certain embodiments, suitable base composition can be formed of any materials known in the art. For example, suitable base compositions can be formed of sphagnum, bark fines, perlite, bark fines, yucca, coconut coir pith, and other organic-based compounds. In certain embodiments, potting mixtures can be substantially free of soil. In other certain embodiments, soil, such as a yard soil, can be included. In certain embodiments, the nutrient sources can be produced without a base composition.

In certain embodiments, the nutrient sources described herein can alternatively be combined with granular base compositions. For example, certain known granular plant growth mediums can include chicken litter as a nutrition source. The nutrient sources described herein (e.g., a combination of feather meal, soybean meal, and optionally compost) can replace the chicken litter of such plant growth mediums. In certain embodiments, the plant growth mediums described herein can be entirely free of chicken litter.

As can be appreciated, plant growth mediums can include additional components. Such additional components can be substantially unmodified. For example, surfactants (or wetting agents), biostimulants, microbes, and other bioactive materials can be included in plant growth mediums in various embodiments without substantial modification. In certain embodiments, the pH of a plant growth medium can be modified as known in the art through inclusion of known pH adjusting agents. For example, limestone can be added to form plant growth mediums having a pH of about 5 to about 5.5.

Additional components and details about plant growth mediums are disclosed in U.S. Pat. Nos. 4,088,528; 4,185,680; 5,269,634; 5,413,618; 5,542,962; 5,567,220; 5,976,211; 5,900,038; 8,024,890; 6,711,850; European Patent EPO 923 854; and PCT applications WO 99/57079 and WO 99/57080, each of which are incorporated herein by reference.

Examples

Example plant growth mediums evaluated herein each contained a base composition formed of 85% sphagnum, 15% perlite and trace quantities of a surfactant. The plant growth mediums were adjusted to a pH of about 5 to about 5.5 through the addition of limestone. If applied to plants, the plant growth mediums were applied at a rate of 1 pound of nitrogen per cubic yard. All nutrient release testing was performed at a temperature of 70° F. (21° C.). As can be appreciated, nutrient release will occur faster at temperatures higher than 70° F. and slower at temperatures lower than 70° F.

Table 1 depicts the nutrient sources of Example plant growth mediums. The nutrient sources and the total quantity of plant available nitrogen released, as a fraction of the total nitrogen added, after eight weeks are depicted. Each of the Examples were normalized by adding the same amount of total nitrogen. Examples 3 and 4 are considered Inventive Examples because they each include a combination of organic feather meal and organic soybean meal as the nutrient source and exhibited desirable plant growth properties.

TABLE 1

| Plant Growth Medium (reporting percentage N—P—K) | Plant Available Nitrogen (% NH$_4$ released) | Plant Available Nitrogen (% NO$_3$ released) | Total Plant Available Nitrogen (% NH4 + NO3) |
|---|---|---|---|
| Comp. Ex. 1: 3-2-3 Chicken litter w/o compost | 12.5 | 14.3 | 26.8 |
| Comp. Ex. 2: 3-2-3 Chicken litter with compost | 9.2 | 14.2 | 23.4 |
| Inv. Ex. 3: 10-2-2 Feather meal and soybean meal w/o compost | 31.0 | 12.3 | 43.3 |
| Inv. Ex. 4: 10-2-2 Feather meal and soybean meal with compost | 27.5 | 29.4 | 56.9 |

As illustrated by Table 1, Inventive Examples 3 and 4 released larger quantities of plant available nitrogen than Comparative Examples 1 and 2.

FIG. 1 depicts a graph illustrating the nutrient release benefits of certain Example plant growth mediums formed with different nutrient sources. Specifically, FIG. 1 depicts the cumulative nitrogen release of: a control with no nutrient source, a nutrient source including granular feather meal pellets, a nutrient source including granular soybean meal pellets, and a nutrient source including a 50%/50% blend of granular feather meal and granular soybean meal.

As illustrated by FIG. 1, the nutrient source including a 50%/50% blend of granular feather meal and granular soybean meal unexpectedly exhibited a greater release of nitrogen than expected. Specifically, the synergistic benefits of feather meal and soybean meal resulted in more nitrogen being released than feather meal or soybean meal alone and higher than the expected weight average of feather meal and soybean meal individually. The nutrient source including a 50%/50% blend of granular feather meal and granular soybean meal exhibited at least as much inorganic nitrogen release alone as soybean meal in spite of being mixed at a ratio of 50%/50% with feather meal.

Figure 2:
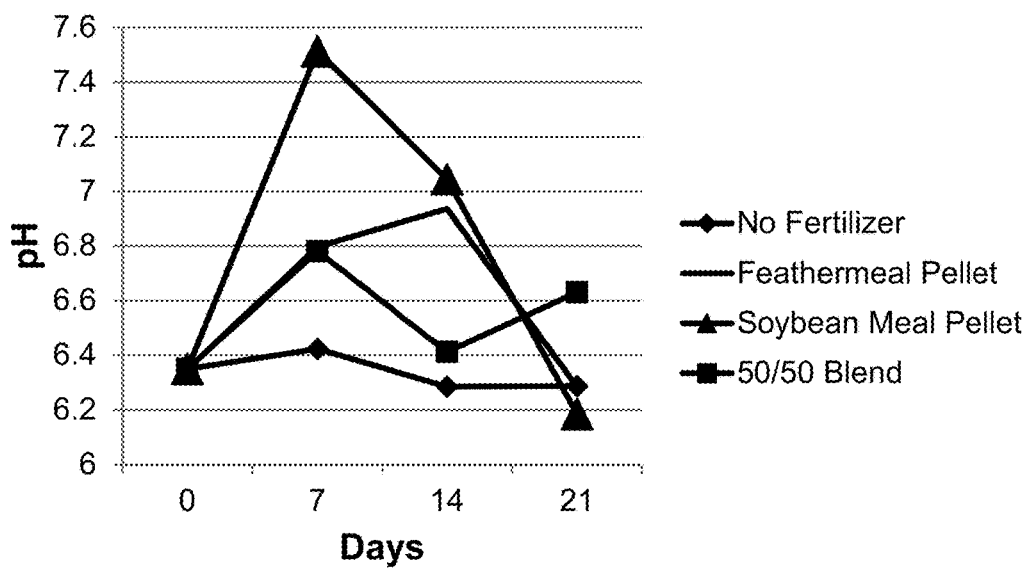
FIG. 2 depicts a graph illustrating the cumulative soil pH of the example nutrient sources in plant growth mediums of FIG. 1.

FIG. 2 depicts a graph illustrating the soil pH of the plant growth mediums depicted in FIG. 1. As illustrated by the graph in FIG. 2, the combination of feather meal and soybean meal as a nutrient source buffered the pH spike at 7 days to a pH of just 6.8 while other example plant growth mediums with other nutrient sources reached a pH of 7.5. The buffered pH exhibited by the combination of feather meal and soybean meal as the nutrient source provides enhanced plant safety. The soil pH shown in FIG. 2 is alternatively depicted in Table 2.

TABLE 2

| Time (d) | No Fertilizer | Feather Meal Pellet | Soybean Meal Pellet | 50/50 Blend |
|---|---|---|---|---|
| 0 | 6.35 | 6.35 | 6.35 | 6.35 |
| 0 | 6.35 | 6.35 | 6.35 | 6.35 |
| 0 | 6.35 | 6.35 | 6.35 | 6.35 |
| 0 | 6.35 | 6.35 | 6.35 | 6.35 |
| 7 | 6.34 | 6.61 | 7.38 | 6.87 |
| 7 | 6.38 | 6.9 | 7.6 | 6.85 |
| 7 | 6.55 | 6.88 | 7.56 | 6.62 |
| 14 | 6.4 | 6.89 | 7.44 | 6.42 |
| 14 | 6.25 | 7.11 | 6.95 | 6.45 |
| 14 | 6.21 | 6.95 | 6.89 | 6.36 |
| 14 | 6.28 | 6.79 | 6.9 | 6.42 |
| 21 | 6.41 | 6 | 6.4 | 6.45 |
| 21 | 6.23 | 6.16 | 6.05 | 6.69 |
| 21 | 6.26 | 6.45 | 6.18 | 6.69 |
| 21 | 6.25 | 6.53 | 6.11 | 6.69 |

Figure 3A:
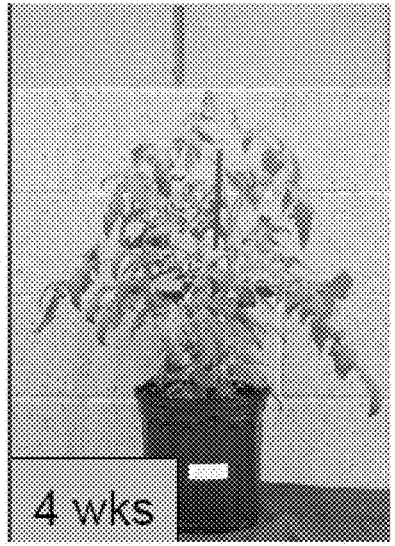
FIG. 3A to 3C are photos depicting tomato plants grown in the example plant growth mediums of FIGS. 1 and 2.
Figure 3B:
Figure 3C:

FIGS. 3A to 3C are related to FIGS. 1 and 2 and depicts pictures of a tomato plants grown in plant growth mediums including soybean meal pellets (FIG. 3A) as the nutrient source, feather meal pellets (FIG. 3B) as the nutrient source, and a 50%/50% blend of feather meal pellets and soybean meal pellets (FIG. 3C) as the nutrient source. The plastic pot and the background wall of each of FIGS. 3A to 3C are identical to aid in comparison. As illustrated by FIGS. 3A to 3C, the combination of feather meal pellets and soybean meal pellets as the nutrient source visibly resulted in the growth of the largest tomato plant with FIG. 3C visibly displaying a tomato plant of both greater height and volume. FIGS. 3A and 3B in contrast depict tomato plants with both less visible height and less visible volume.

The plant growth of FIGS. 3A to 3C was also quantitatively measured using a growth index which accounted for the total volume of above-the-ground plant growth. The mean growth index of plants grown with soybean meal as the nutrient source (e.g., FIG. 3A) was 62.83, the mean growth index of plants grown with feather meal pellets as the nutrient source (e.g., FIG. 3B) was 62.92, and the mean growth index of plants grown with a 50%/50% blend of soybean pellets and feather meal pellets as the nutrient source (e.g., FIG. 3C) was 71.42. The mean growth index of the nutrient source with a 50%/50% blend of soybean pellets and feather meal pellets is a statistically significant increase compared to either of the single organic nutrient sources in FIGS. 3A and 3B.

Table 3 depicts further examples of nutrient sources for Example plant growth mediums. The evaluated nutrient sources in Table 3 include combinations of feather meal, bone meal, soybean meal, and alfalfa meal in order to determine if nutrient sources other than feather meal or soybean meal could provide agronomical benefits. Additionally, Table 3 also includes Example plant growth mediums including nutrient sources that have varying weight ratios of soybean meal to feather meal. The total plant available nitrogen released (e.g., $NH_4$ nitrogen and $NO_3$ nitrogen released) over 72 days using column leach data, as a fraction of the total nitrogen in the nutrient sources, is further depicted in Table 3.

Examples 9 to 11 are considered Inventive Examples because they each include a combination of feather meal and soybean meal as the nutrient source and exhibited desirable plant available nitrogen release.

TABLE 3

| Nutrient Source | Total Plant Available Nitrogen (% NH4 + NO3) |
|---|---|
| Comp. Ex. 5: 50% bone meal, 50% feather meal | 49.8 |
| Inv. Ex. 6: 50% fish meal, 50% feather meal | 54.9 |
| Comp. Ex. 7: 50% alfalfa meal, 50% feather meal | 43.1 |
| Comp. Ex. 8: 0% soy meal, 100% feather meal | 44.5 |
| Inv. Ex. 9: 25% soy meal, 75% feather meal | 57.0 |
| Inv. Ex. 10: 50% soy meal, 50% feather meal | 57.2 |
| Inv. Ex. 11: 75% soy meal, 25% feather meal | 57.6 |
| Comp. Ex. 12: 100% soy meal, 0% feather meal | 57.0 |

As depicted by Table 3, Inventive Examples 9 to 11, including a combination of both soybean meal and feather meal, exhibited a desirable release of plant available nitrogen.

Figure 4:
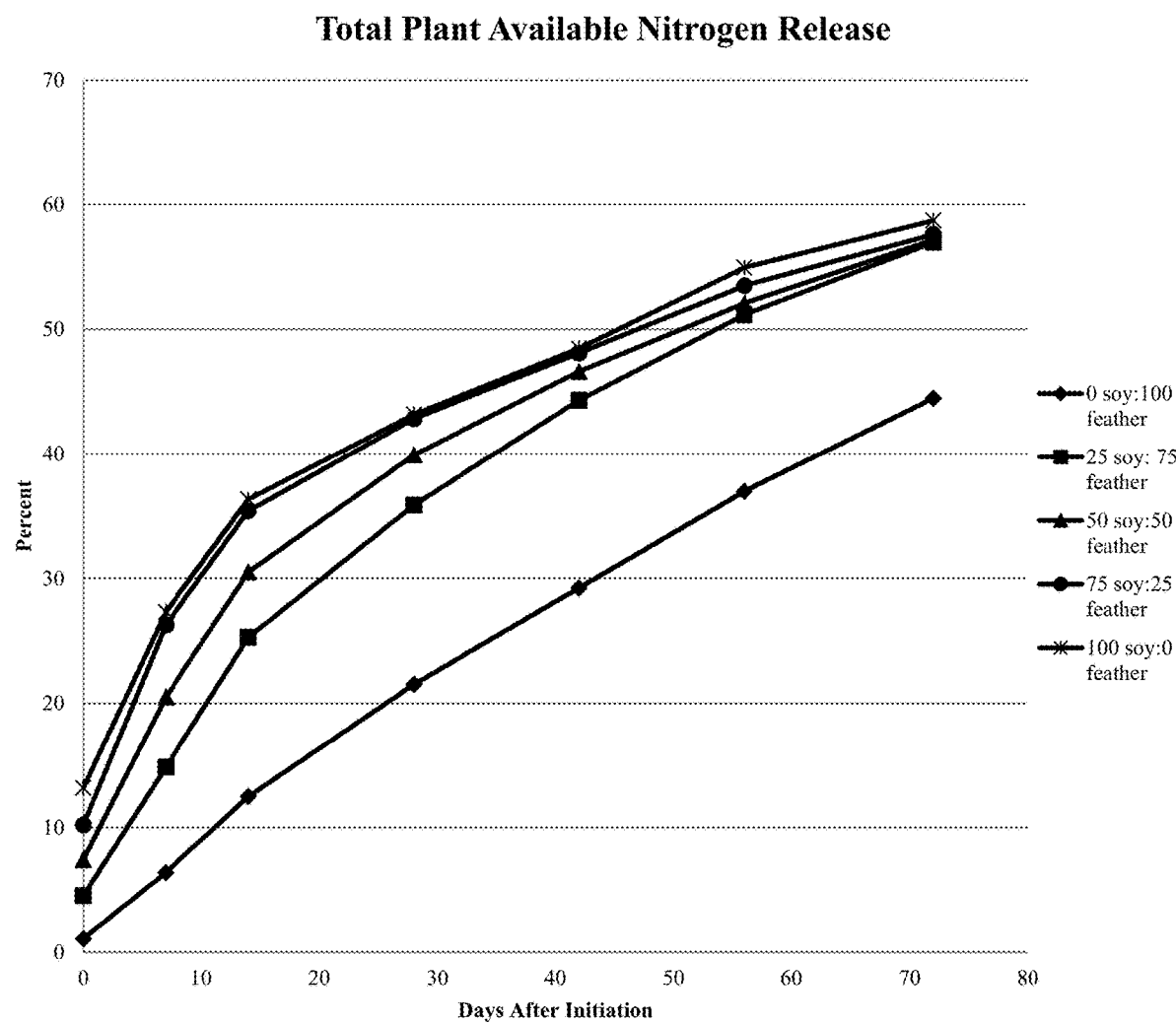
FIG. 4 depicts a graph illustrating the cumulative plant available nitrogen release of example plant growth mediums.

FIG. 4 depicts a graph illustrating the nitrogen release profile of Examples 8 to 12. As depicted by FIG. 4, nutrient sources including soybean meal release plant available nitrogen at a relatively fast rate while nutrient sources including feather meal release plant available nitrogen at a relatively slow rate. Inventive Examples 9, 10, and 11 including 25% soybean meal and 75% feather meal; 50% soybean meal and 50% feather meal; and 75% soybean meal and 25% feather meal respectively, exhibited nitrogen release profiles with the most desirable agronomic release profiles. In addition to the desirable nitrogen release profile which was better than either feather meal or soybean meal alone, Inventive Examples 9 to 11 also released a greater quantity of plant available nitrogen than expected (e.g., greater than the weighted average of the plant available nitrogen of feather meal and soybean meal individually) demonstrating a synergistic benefit, and mitigated an expected pH spike (as depicted in FIG. 2).

Figure 5:
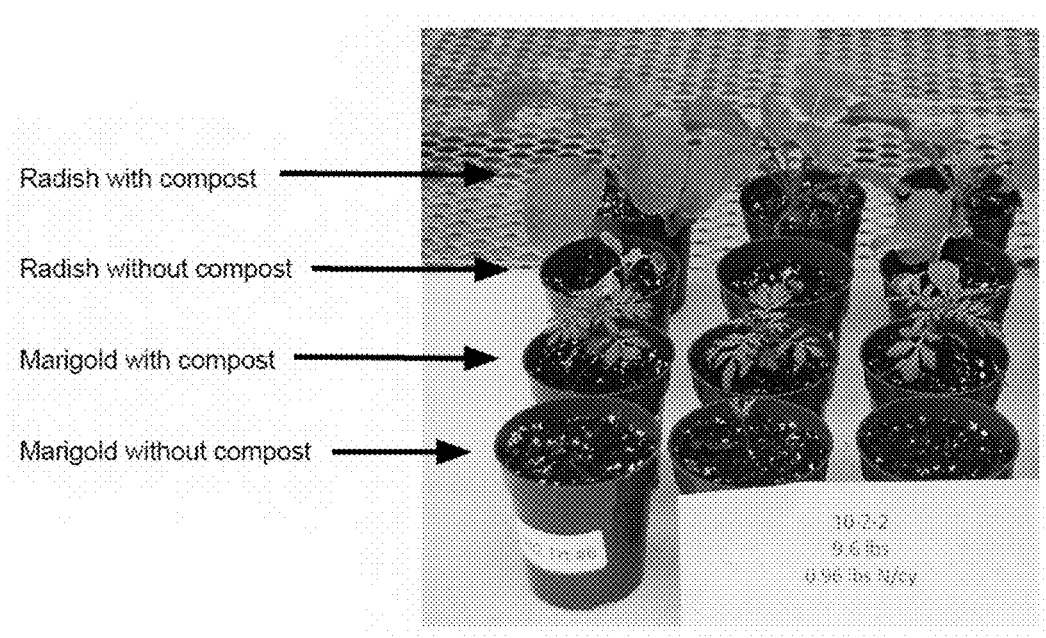
FIG. 5 is a photo depicting the plant growth of radish and marigold plants in example plant growth mediums.

FIG. 5 depicts a photo illustrating the plant growth of radish and marigold plants grown in plant growth mediums including feather meal, soybean meal, and optionally compost as the nutrient source. The plant growth mediums were applied at a rate of 0.96 pounds nitrogen per cubic yard. Pictorially, marigold grown without compost exhibited no growth in 2 out of 3 pots with only slight germination in the third pot. Marigold, grown with compost, in contrast, showed substantially more growth with each of the three pots showing leaf development. Radish growth without compost exhibited minor growth in 2 out of the 3 pots with early stage leaf formation showing. Radish grown with compost exhibited substantially more developed leafing with substantially larger leaves in all three pots.

As illustrated by FIG. 5, the inclusion of compost in the nutrient source significantly reduced ammonium toxicity resulting in larger plant growth.

Figure 6:
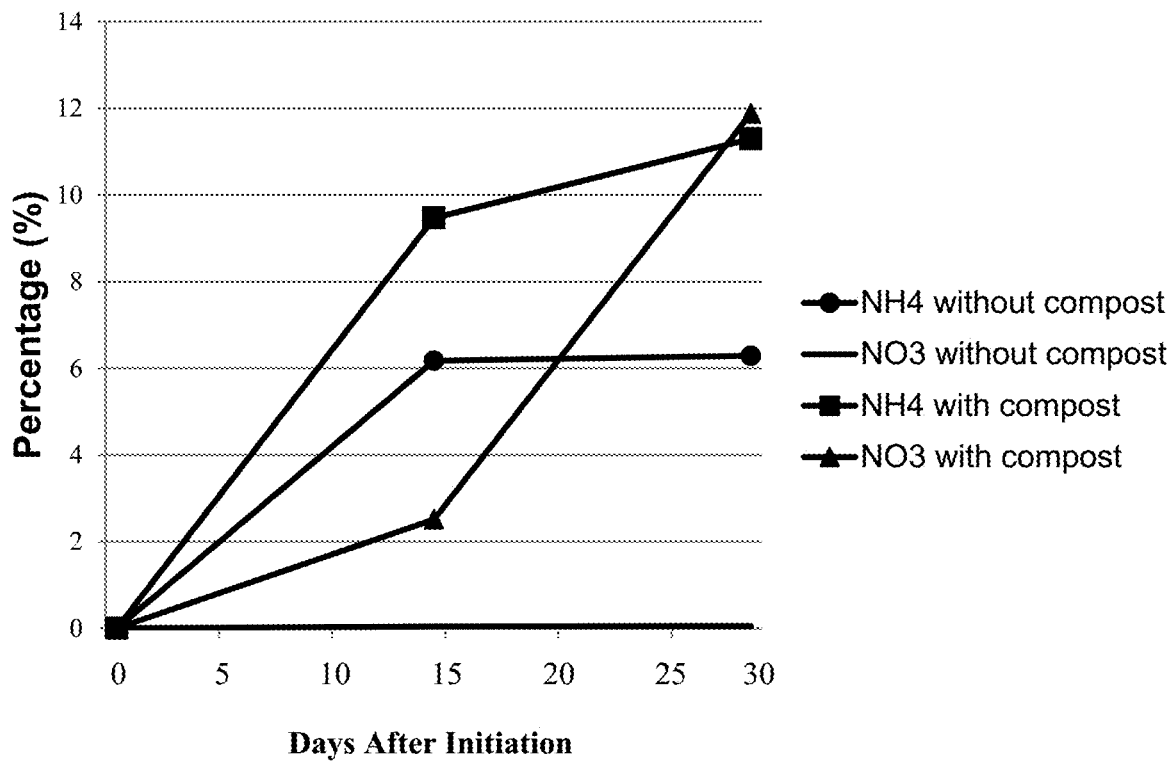
FIG. 6 depicts a graph illustrating the conversion rate of nitrogen to nitrate for several example plant growth mediums.

FIG. 6 depicts a graph further illustrating the changes in nutrient release dynamics of nutrient sources containing compost by displaying the percentage of nitrogen released after a certain number of days. For FIG. 6, each of the plant growth mediums included nutrient sources formed of feather meal, soybean meal and optionally compost.

FIG. 6 illustrates that inclusion of compost to a nutrient source leads to an increased rate of conversion of nitrogen to nitrate. As can be appreciated, comparative plant growth mediums formed with known nutrient sources exhibit a slower conversion to nitrate, shorter benefits, and smaller quantities of nitrate.

Figure 7:
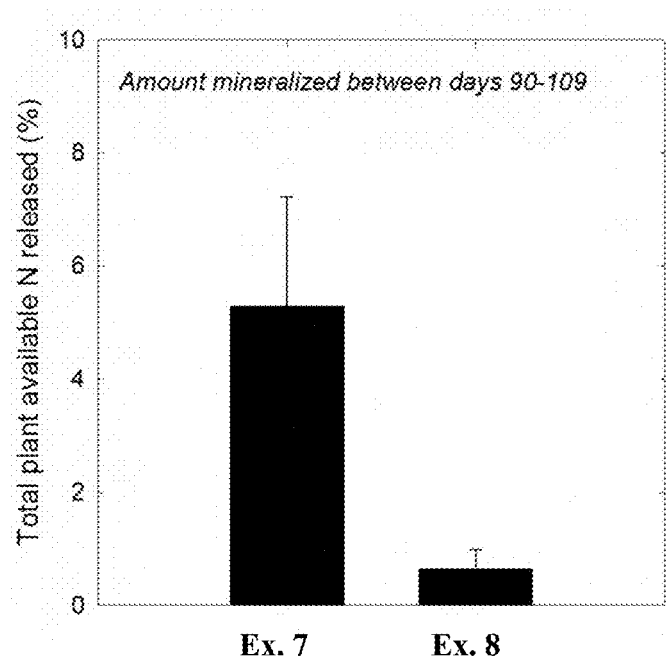
FIG. 7 depicts a bar graph illustrating the amount of plant available nitrogen released 90 to 109 days after application for two example plant growth mediums.

FIG. 7 depicts a bar graph detailing the plant available nitrogen released between 90 days and 109 days after application for Examples 13 and 14. Example 13 is a plant growth medium including a nutrient source formed with a 50/50 blend of feather meal and soybean meal having an N-P-K ratio of 10-2-2. Example 14 includes chicken litter as the nutrient source.

As illustrated by FIG. 7, Inventive Example 13 released about 5.5% plant available nitrogen between 90 days and 109 days after application compared to a release of less than 0.5% plant available nitrogen by a chicken litter plant growth medium (Ex. 14). Such meaningful plant available nitrogen release demonstrates that the plant growth mediums including the nutrient sources described herein can act as a long-term fertilizer and can provider fertilization past about 12 weeks. Comparative organic plant growth mediums, as shown in Example 14, do not exhibit meaningful agronomic benefit at 12 weeks.

Figure 8:
FIG. 8 is a photo depicting the growth of plants in toxic soil with varying levels of supplemental organic nitrate.

FIG. 8 depicts a picture of plants grown in a toxic level of pure feather meal (1.0 lb. N per cubic yard). Varying quantities of Chilean Nitrate were included, as a percentage of the total nitrogen, in the plant growing mixture. As illustrated by the photo, the inclusion of Chilean Nitrate significantly decreased the ammonium toxicity caused by the pure feather meal with only a single pot out of three showing germination of a plant. Increasing levels of Chilean Nitrate improved the amount of plant growth. 2.5% Chilean Nitrate had only one pot show germination but exhibited flowering. Increasing the Chilean Nitrate to 5% total nitrogen, all three pots showed plant growth with one plant flowering. At 10% Chilean Nitrate total nitrogen loading, all three plants flowered. At 15% Chilean Nitrate total nitrogen loading, all three plants flowered and showed greater growth than the plants at the 10% Chilean Nitrate loading level. Finally, plants grown with 20% of the nitrogen coming from Chilean Nitrate showed the best growth with all three plants flowering and being larger in size than any other plant grown in the bioassay.

Figure 9:
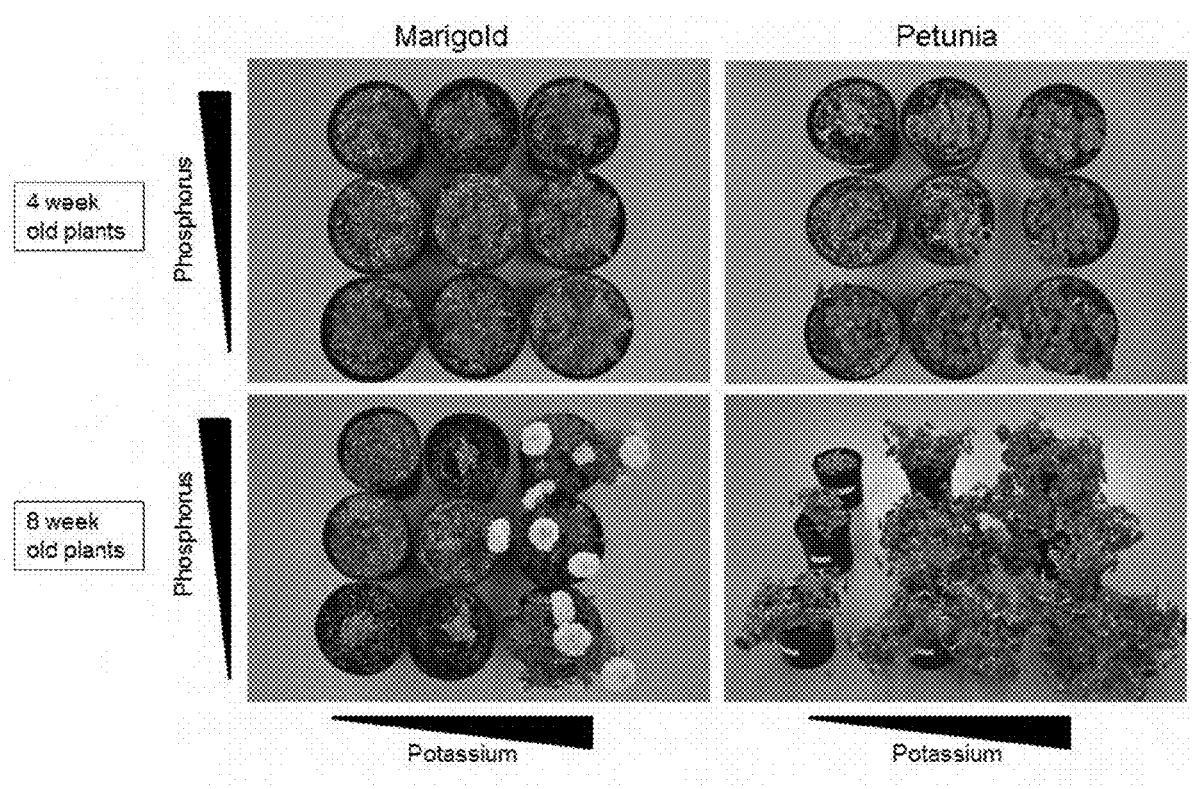
FIG. 9 is a photo of a greenhouse bioassay evaluating the effect of potassium level on plant growth.

FIG. 9 depicts a picture of the results of a 10 week greenhouse bioassay with marigold and petunia plants. The formulations depicted in FIG. 9 were formulated using quantities of organic feather meal, natural phosphorus, and potash reported in Table 4.

TABLE 4

| Phosphorus | Potassium | Feather meal (g) | Natural Phosphorus (g $P_2O_5$) | Potassium Sulfate (g $K_2O$) | N—P—K |
|---|---|---|---|---|---|
| Low | Low | 3.27 | 0.25 | 0.25 | 12-1-1 |
| Low | Medium | 3.27 | 0.25 | 1 | 11-1-4 |
| Low | High | 3.27 | 0.25 | 4 | 9-1-11 |
| Medium | Low | 3.27 | 0.5 | 0.25 | 12-2-1 |
| Medium | Medium | 3.27 | 0.5 | 1 | 11-2-4 |
| Medium | High | 3.27 | 0.5 | 4 | 9-2-11 |
| High | Low | 3.27 | 1 | 0.25 | 11-3-1 |
| High | Medium | 3.27 | 1 | 1 | 10-3-4 |
| High | High | 3.27 | 1 | 4 | 9-3-11 |

The bioassay photographed in FIG. 9 shows the growth of 9 marigold plants and 9 petunia plants 5 weeks after planting (mid harvest) and at 10 weeks (end harvest). At 5 weeks, each of the marigold plants shows germination with slight increases in size associated with each increase in potassium loading levels. However, at 10 weeks, only the marigold plants grown with high potassium survived. Petunia plants exhibited similar trends as marigold plants at 5 weeks with slight increases in size associated with each increase in potassium loading levels. At 10 weeks, each of the petunia plants survived but there were significant size increase associated with each increase in potassium loading levels.

As illustrated by the results of the bioassay, increasing levels of potassium optimized the N-P-K ratio and protected against ammonium toxicity.

Figure 10:
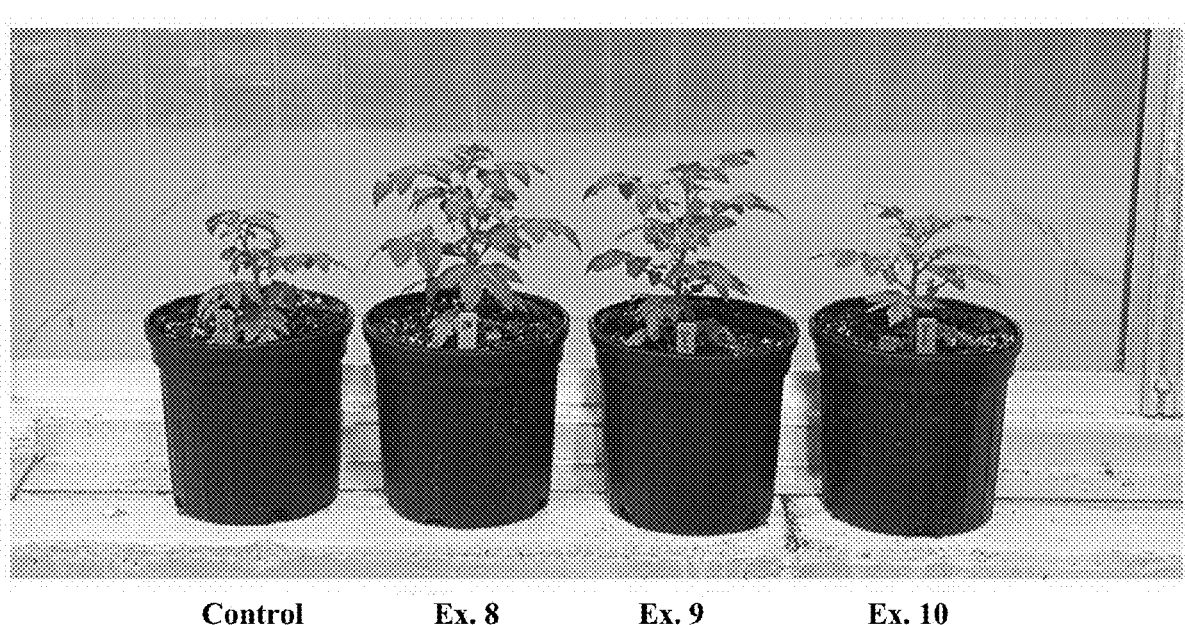
FIG. 10 is a photo comparing the growth of tomato plants grown in various example plant growth mediums.

FIG. 10 depicts a picture of tomato plants 7 days after the application of various plant growth mediums. The plant growth mediums of FIG. 10 specifically include the following nutrient sources: an unfed control; a 50/50 blend of feather meal and soybean meal, Chilean nitrate, and additional potassium (Ex. 15); a conventional plant growth medium (Ex. 16); and a commercial organic plant growth medium (Ex. 17).

As depicted in FIG. 10, the control tomato plant exhibits little growth. The tomato plant grown in the plant growth medium of Example 15 exhibits considerable growth and achieved the both the greatest height and the greatest volume out of all four tomato plants. The tomato plant grown in the plant growth medium of Example 16 was similar in size to the tomato plant grown in the plant growth medium of Example 15 but was slightly smaller in both height and volume. Conversely, the tomato plant grown in the plant growth medium of Example 17 was similar in size to the tomato plant grown in the control plant growth medium.

As demonstrated by the picture of FIG. 10, plant growth mediums including the nutrient sources described herein (e.g., Ex. 15) can demonstrate superior agronomic performance compared to other organic plant growth mediums (Ex. 17) and can demonstrate comparable agronomic performance as conventional plant growth mediums (Ex. 16). FIG. 10 additionally illustrates that the plant growth mediums including the nutrient sources described herein (e.g., Ex. 15) are fast acting and can cause desirable plant growth in less than 7 days due to the immediate release of plant available nitrogen.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A nutrient source for a plant growth medium comprising:
   feather meal and soybean meal in a ratio of about 2.5:1 to a ratio of about 3:1, by weight of the nitrogen in the feather meal and soybean meal, the feather meal comprising about 13% or more nitrogen by weight and about 6% or less water by weight;
   a potassium compound; and
   Chilean nitrate; and
   wherein the Chilean nitrate comprises about 5% to about 20%, by weight, of the total nitrogen; and
   wherein the nutrient source N-P-K ratio comprises about 9% to about 10% nitrogen, about 1% to about 3% phosphorous, and about 10% to about 11% potassium.

2. The nutrient source of claim 1, further comprising compost.

3. The nutrient source of claim 2 comprising, by volume, about 5% to about 70% compost.

4. The nutrient source of claim 1 comprising, by weight, about 0.5% to about 4% of a phosphorous source.

5. The nutrient source of claim 1 is organic.

6. The nutrient source of claim 1 is substantially free of chicken litter.

7. A plant growth medium comprising:
   a base composition; and
   the nutrient source of claim 1.

8. The plant growth medium of claim 7, wherein the plant growth medium is a garden soil, soil amendment, or a potting mixture.

9. The plant growth medium of claim 7, wherein the plant growth medium is an organic plant growth medium.

10. The plant growth medium of claim 7, wherein the base composition comprises one or more members selected from the group consisting of sphagnum, perlite, bark fines, and a surfactant.

11. A method of fertilizing one or more plants comprising application of a nutrient source to one or more plants; and
    wherein the nutrient source comprises:
        feather meal and soybean meal in a ratio of about 2.5:1 to a ratio of about 3:1, by weight of the nitrogen in the feather meal and soybean meal, the feather meal comprising about 13% or more nitrogen by weight and about 6% or less water by weight;
        a potassium compound; and
        Chilean nitrate; and
    wherein the Chilean nitrate comprises about 5% to about 20%, by weight, of the total nitrogen; and
    wherein the nutrient source N-P-K ratio comprises about 9% to about 10% nitrogen, about 1% to about 3% phosphorous, and about 10% to about 11% potassium.

12. The method of claim 11, wherein a plant is grown in the nutrient source.

13. The method of claim 12, wherein the nutrient source is mixed with a base composition.

14. The method of claim 12, wherein the nutrient source is applied at a rate of about 0.5 pounds to about 1.5 pounds per cubic yard.

15. The method of claim 12 wherein the plant does not exhibit ammonium toxicity.

16. The method of claim 11, wherein the nutrient source releases greater plant available nitrogen than the weighted average plant available nitrogen release of each component.

17. The method of claim 11, wherein the nutrient source maintains an agronomic response over a period of about 90 days or greater.

18. The method of claim 11, wherein the nutrient source releases plant available nitrogen; and
    wherein about 5% or more of the total nitrogen available as plant available nitrogen is released during the period between about 90 days to about 109 days after initial application of the nutrient source.

19. The method of claim 11, wherein the nutrient source releases one or more of:
    about 40% or more of the total nitrogen available as plant available nitrogen in a period of about 8 weeks or less after initial application of the nutrient source; and
    about 57% or more of the total nitrogen available as plant available nitrogen in a period of about 72 days or less after initial application of the nutrient source.

* * * * *